United States Patent
Choi et al.

(10) Patent No.: US 10,081,173 B2
(45) Date of Patent: Sep. 25, 2018

(54) FILM PEELING APPARATUS AND A METHOD OF PEELING FILM

(71) Applicant: SAMSUNG DISPLAY CO., LTD., Yongin-si, Gyeonggi-Do (KR)

(72) Inventors: Won Woo Choi, Hawseong-si (KR); Seung Ho Yoon, Hwaseong-si (KR)

(73) Assignee: SAMSUNG DISPLAY CO., LTD., Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/610,859

(22) Filed: Jun. 1, 2017

(65) Prior Publication Data

US 2017/0348961 A1 Dec. 7, 2017

(51) Int. Cl.
*B32B 43/00* (2006.01)

(52) U.S. Cl.
CPC ...... *B32B 43/006* (2013.01); *B32B 2457/206* (2013.01); *Y10S 156/93* (2013.01); *Y10S 156/941* (2013.01); *Y10T 156/1168* (2015.01); *Y10T 156/1184* (2015.01); *Y10T 156/1189* (2015.01); *Y10T 156/1967* (2015.01); *Y10T 156/1972* (2015.01)

(58) Field of Classification Search
CPC .............. B32B 43/006; C09J 2205/302; Y10T 156/1168; Y10T 156/1184; Y10T 156/1967; Y10T 156/1972; Y10S 156/93; Y10S 156/941

See application file for complete search history.

(56) References Cited

U.S. PATENT DOCUMENTS

| 3,028,280 | A  | * | 4/1962 | Hoffman | C09J 7/04 |
| | | | | | 156/714 |
| 8,951,387 | B2 | * | 2/2015 | Kang | B29C 63/0013 |
| | | | | | 156/712 |
| 2003/0183637 | A1 | * | 10/2003 | Zappa | B26D 3/085 |
| | | | | | 220/359.2 |
| 2015/0059986 | A1 | * | 3/2015 | Komatsu | B26D 3/08 |
| | | | | | 156/510 |
| 2015/0319893 | A1 | * | 11/2015 | Ohno | B32B 43/006 |
| | | | | | 156/702 |

FOREIGN PATENT DOCUMENTS

| DE | 19720845 A1 * | 11/1998 | ............... B09B 5/00 |
| JP | 2006-121035 | 5/2006 | |
| KR | 10-1458406 | 11/2014 | |
| KR | 10-2015-0043909 | 4/2015 | |
| KR | 10-2015-0046597 | 4/2015 | |
| KR | 10-2016-0020075 | 2/2016 | |
| WO | 2011077854 | 6/2011 | |
| WO | WO 2011039702 A9 * | 11/2011 | ........... B32B 43/006 |

* cited by examiner

*Primary Examiner* — Mark A Osele
(74) *Attorney, Agent, or Firm* — F. Chau & Associates, LLC

(57) ABSTRACT

A film peeling apparatus including a peeling unit, a peeling unit position adjusted, and a clamp. The peeling unit has uneven portions at an end portion thereof. The peeling unit is configured to peel off a protection film attached on a display panel. The peeling unit position adjuster is connected to the peeling unit. The peeling unit position adjuster is configured to adjust a position of the peeling unit. The clamp is disposed separately from the peeling unit. The clamp is configured to clamp the peeling unit.

20 Claims, 11 Drawing Sheets

FILM PEELING APPARATUS AND A METHOD OF PEELING FILM

CROSS-REFERENCE TO RELATED APPLICATION

This application claims priority under 35 U.S.C. § 119 to Korean Patent Application No. 10-2016-0068947 filed in the Korean Intellectual Property Office on Jun. 2, 2016, the entire contents of which are incorporated by reference herein.

TECHNICAL FIELD

Exemplary embodiments of the present invention relate to a film peeling apparatus and a method of peeling film.

DISCUSSION OF RELATED ART

Display devices may include a liquid crystal display (LCD) or an organic light-emitting diode (OLED) display.

A flexible display device has been recently developed. The OLED display can be included in the flexible display device. The OLED display may include a display panel. The display panel may include two electrodes and an organic emission layer. The organic emission layer may be disposed between the two electrodes. Electrons injected from a cathode and holes injected from an anode may bond to each other in the organic light-emitting layer to form excitons. The cathode and the anode may each be electrodes. Light may be emitted when the excitons discharge energy and fall from an excited state to a ground state.

In the OLED display, a protective film may be attached to opposite surfaces of the display panel. The protective film may be configured to protect the display panel. However, a turn-on test pad for examining turn-on may be formed on an upper surface of the display panel. The protective film may be disposed in a peripheral portion of the display panel. Thus a portion of the protective film may be removed for the turn-on test in order to expose the turn-on test pad to the outside.

The protective film including the turn-on test pad may be cut by using a laser. A cut protective film may be removed by using a film peeling apparatus.

In some instances, the protective film may not be completely removed, or the protective film is overly removed and the display unit of the display panel is not protected. A film peeling apparatus may also scratch the display panel.

SUMMARY

One or more exemplary embodiments of the present invention provide a film peeling apparatus and a method of peeling film, which may increase a film peeling efficiency of a protective film.

An exemplary embodiment of the present invention provides a film peeling apparatus. The film peeling apparatus includes a peeling unit, a peeling unit position adjuster, and a clamp. The peeling unit has uneven portions at an end portion thereof. The peeling unit is configured to peel off a protection film attached on a display panel. The peeling unit position adjuster is connected to the peeling unit. The peeling unit position adjuster is configured to adjust a position of the peeling unit. The clamp is disposed separately from the peeling unit. The clamp is configured to clamp the peeling unit.

The peeling unit may include a peeling pin and a peeling rod. The peeling pin may be configured to contact the protective film. The peeling rod may extend from the peeling pin and may be connected to the peeling unit position adjuster. An end portion of the peeling pin may have the uneven portions.

The peeling pin may include a first surface and a second surface. The first surface may have a first width extending in a first direction. The second surface may have a second width extending in a second direction. The second direction may cross the first direction. The first width may be greater than the second width.

A longitudinal direction of the uneven portions may be substantially parallel to the first direction.

The film peeling apparatus may further include a stage. The stage may be configured to mount the display panel therein.

An exemplary embodiment of the present disclosure provides a film peeling method. The method includes providing a peeling unit having uneven portions at an end portion thereof. The peeling unit is contacted a peripheral protective film attached to a peripheral portion of a display panel. The peripheral protective film is separated from a display protective film of a display unit of the display panel by moving the peeling unit. A curved portion in the peripheral protective film is formed by moving the peeling unit. The peripheral protective film is removed from the display panel.

The film peeling method may further include cutting the protective film disposed on the display panel by using a laser. The peripheral protective film and the display protective film are separated from each other along a cutting line.

A position of the peeling unit may be adjusted by using a peeling unit position adjuster connected to the peeling unit.

The peeling unit may include a peeling pin. The peeling pin may be configured to contact the protective film, and an end portion of the peeling pin has the uneven portions extending in a first direction.

The peeling pin may be disposed such that a longitudinal direction of the uneven portions is substantially parallel to the cutting line to allow the peeling pin to contact the peripheral protective film.

The peeling pin may be moved in a second direction that crosses the cutting line to separate the peripheral protective film from the display protective film.

The peeling pin may be moved in the first direction to form a curved portion in the peripheral protective film.

The peripheral protective film may be removed from the display panel by clamping the curved portion of the peripheral protective film with a clamp.

Adjacent uneven portions of the peeling unit may be separated from each other by about 50 nm to about 400 nm.

The film peeling apparatus may further include a turn-on test pad. The turn-on test pad may be disposed in a peripheral portion of the display panel. The turn-on test pad may be configured to be accessed for performing a turn-on test of the display panel.

An exemplary embodiment of the present invention provides a film peeling apparatus. The film peeling apparatus includes a peeling unit, a peeling unit position adjuster, and a clamp. The peeling unit has a plurality of uneven portions at an end portion thereof. The peeling unit position adjuster is connected to the peeling unit. The clamp is disposed separately from the peeling unit to clamp the peeling unit. Adjacent uneven portions of the peeling unit are separated from each other by about 50 nm to about 400 nm.

The film peeling apparatus may further include a stage. The stage may be configured to mount the display panel therein.

The peeling unit may include a peeling pin and a peeling rod. The peeling pin may be configured to contact a protective film attached on a display panel. The peeling rod may extend from the peeling pin. The peeling rod may be connected to the peeling unit position adjuster.

An end portion of the peeling pin may have a plurality of uneven portions.

The peeling pin may include steel (SUS), aluminum (Al), or polyether ether ketone (PEEK).

The peeling pin may be configured to exert a frictional force. The frictional force may be larger than an adhesive force of the protective film.

The peeling unit may be disposed above each of the protective film and the clamp. The clamp may be disposed at a side of the protective film.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EMBODIMENTS

Figure 1:
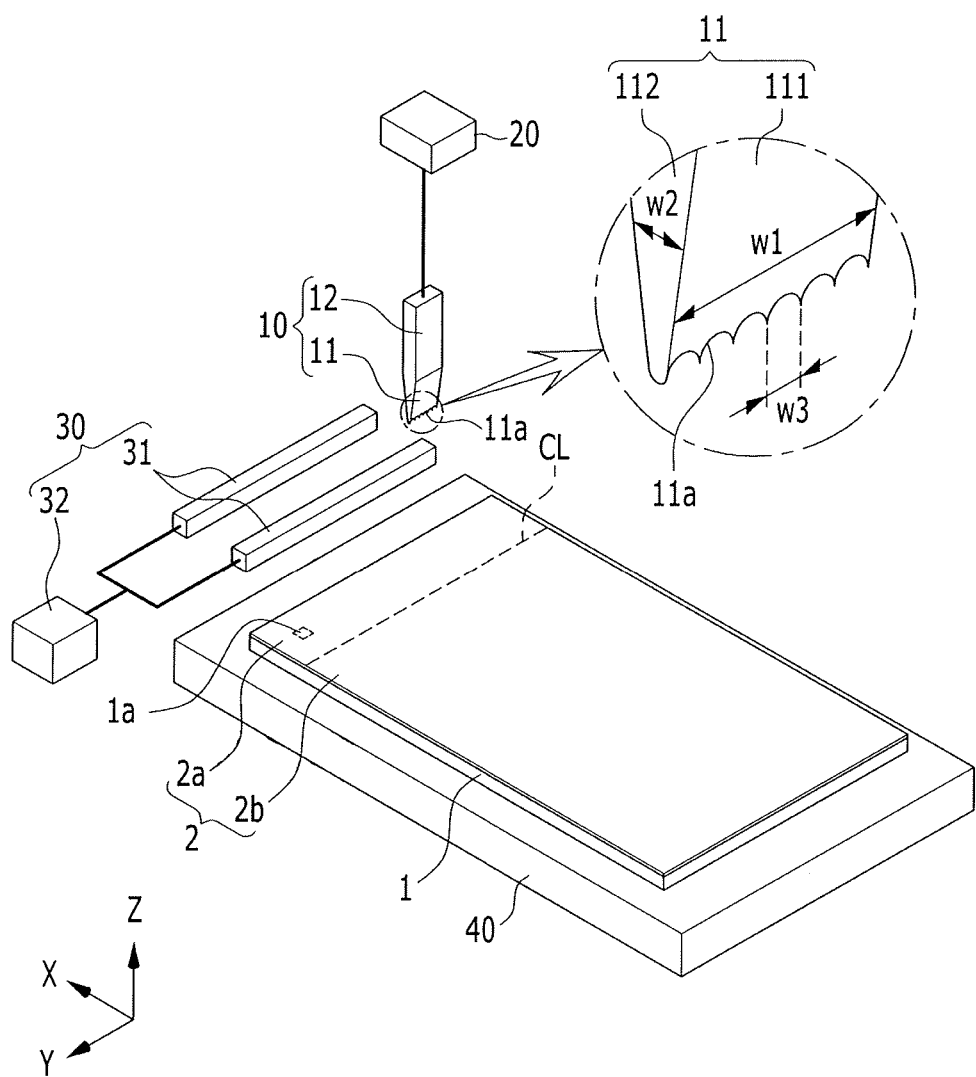
FIG. 1 is a perspective view schematically illustrating a film peeling apparatus according to an exemplary embodiment of the present invention.

The present invention will be described more fully hereinafter with reference to the accompanying drawings, in which exemplary embodiments of the disclosure are illustrated. As those skilled in the art would realize, the described exemplary embodiments of the present invention may be modified in various different ways, all without departing from the spirit or scope of the present invention.

Like numerals may refer to like or similar constituent elements throughout.

Further, since sizes and thicknesses of constituent members illustrated in the accompanying drawings are arbitrarily given for better understanding and ease of description, the present disclosure is not limited to the illustrated sizes and thicknesses.

In the drawings, the thickness of layers, films, panels, regions, etc., may be exaggerated for clarity. In the drawings, for better understanding and ease of description, the thicknesses of some layers and areas may be exaggerated.

It will be understood that when an element such as a layer, film, region, or substrate is referred to as being "on" another element, it may be directly on the other element or intervening elements may also be present.

When a certain exemplary embodiment may be implemented differently, a specific process order may be performed differently from the described order. For example, two consecutively described processes may be performed at substantially the same time or performed in an order opposite to the described order.

FIG. 1 is a perspective view schematically illustrating a film peeling apparatus according to an exemplary embodiment of the present invention.

Referring to FIG. 1, the film peeling apparatus may include a peeling unit 10, a peeling unit position adjuster 20, a clamp 30, and a stage 40. The peeling unit 10 may be configured to peel off a protective film 2. The protective film 2 may be attached to a display panel 1. The peeling unit position adjuster 20 may be connected to the peeling unit 10. The peeling unit position adjuster 20 may be configured to adjust a position of the peeling unit 10. The clamp 30 may be disposed separately from the peeling unit 10. The clamp 30 may be configured to clamp the peeling unit 10. The display panel 1 may be disposed on the stage 40. For example, the display panel 1 may be affixed to the stage 40.

The peeling unit 10 may include a peeling pin 11 and a peeling rod 12. The peeling pin 11 may be configured to directly contact the protective film 2. The peeling rod 12 may extend from the peeling pin 11. The peeling rod 12 may be connected with the peeling unit position adjuster 20. The protective film 2 may include a display protective film 2b. The display protective film 2b may be configured to cover and protect the display panel 1. The display protective film 2b may be configured to cover a display unit of the display panel 1. The protective film 2 may include a peripheral protective film 2a. The peripheral protective film 2a may be configured to cover a peripheral portion of the display panel 1.

The display panel 1 may be a flat display device such as an organic light-emitting diode display device or a liquid crystal display device. A turn-on test pad 1a may be disposed in a peripheral portion of the display panel 1. The turn-on test pad 1a may be used for a turn-on test. The display protective film 2b may be configured to cover the turn-on test pad 1a. The peeling unit 10 may be configured to remove the peripheral protective film 2a from the display panel 1.

The peeling pin 11 may have a plurality of uneven portions 11a. The uneven portions 11a may be disposed at an end portion of the peeling pin 11. The peeling pin 11 may include a first surface 111 and a second surface 112. The first surface 111 may have a first width w1 extending in a first direction (e.g., a Y-axis direction). The second surface 112 may have a second width w2 extending in a second direction (e.g., an X-axis direction). The second direction may cross the first direction. The uneven portions 11a may extend in the first direction (e.g., the Y-axis direction). Thus, the first width w1 of the first surface 111 may be larger than the second width w2 of the second surface 112; however, exemplary embodiments of the present invention are not limited thereto.

In a peeling process, the uneven portions 11a of the peeling pin 11 may directly contact the peripheral protective film 2. Accordingly, a frictional force between the peeling pin 11 and the peripheral protective film 2a may increase. The frictional force between the peeling pin 11 and the peripheral protective film 2a may increase and may be greater than an adhesive force of the peripheral protective film 2a. Thus the peripheral protective film 2a may be relatively easily removed from the display panel 1.

By forming the uneven portions 11a at the end portion of the peeling pin 11 which directly contacts the protective film 2, a frictional force between the peeling pin 11 and the protective film 2 may be increased.

A third width w3 between adjacent uneven portions 11a may be in a range of about 50 μm to about 400 μm. A relatively high cost and a relatively complex process may be needed for the third width w3 to be smaller than about 50 μm. When the third width w3 is greater than about 400 μm, the frictional force between the peeling pin 11 and the peripheral protective film 2a might not be larger than the adhesive force of the peripheral protective film 2a. Thus, it may be relatively difficult to remove the peripheral protective film 2a from the display panel 1.

The peeling pin 11 may include stainless steel (SUS), aluminum (Al), or polyether ether ketone (PEEK).

The peeling unit position adjuster 20 may be connected to the peeling rod 12. The peeling unit position adjuster 20 may be configured to adjust a position of the peeling pin 11. The peeling unit position adjuster 20 may adjust the position of the peeling pin 11 by moving the peeling pin 11 in horizontal directions (e.g., the X-axis direction and the Y-axis direction) and a vertical direction (e.g., a Z-axis direction).

Figure 8:
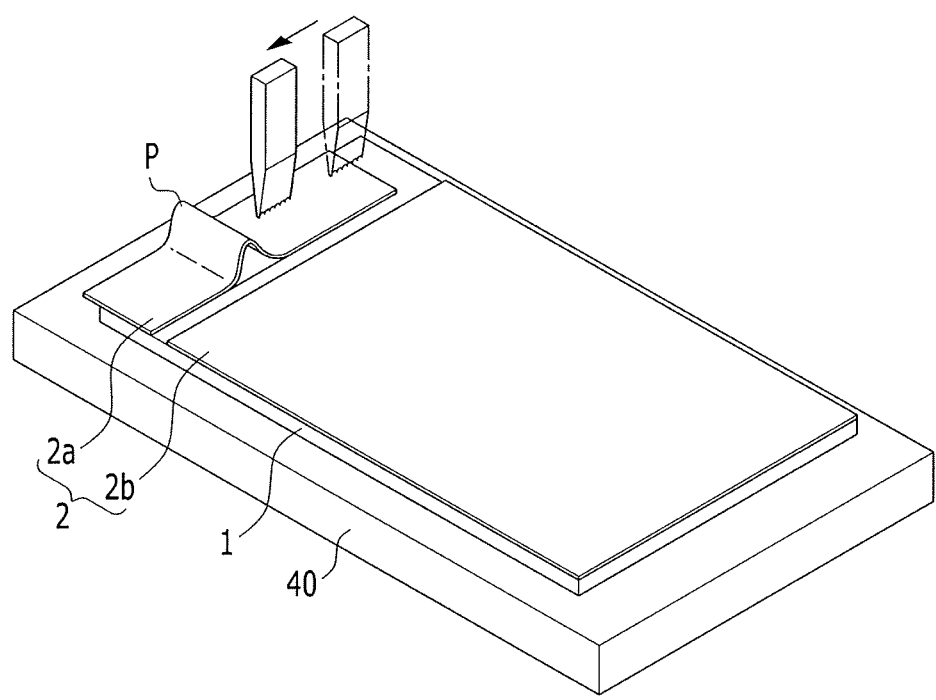
FIG. 8 is a perspective view illustrating a step following a step of FIG. 5 according to an exemplary embodiment of the present invention.

The clamp 30 may include a pair of tongs 31. The clamp 30 may also include a tongs mover 32. The tongs mover 32 may be configured to move the pair of tongs 31. When the peripheral protective film 2a is separated from a surface of the display panel 1, the peripheral protective film 2a may have a curved portion P as illustrated in FIG. 8. When the peripheral protective film 2a has the curved portion P, the pair of tongs 31 may clamp the curved portion P. The pair of tongs 31 may peel off the peripheral protective film 2a from the display panel 1 by using the tongs mover 32.

The stage 40 may be configured to adsorb the display panel 1 by using, for example, a porous adsorption pad. Accordingly, the display panel 1 may be affixed to the stage 40. As illustrated in FIG. 1, a single display panel 1 may be mounted to the stage 40; however, exemplary embodiments of the present invention are not limited thereto. For example, a plurality of display panels 1 may be mounted on the stage 40 and the peripheral protective film 2a may be peeled off the display panels 1.

A film peeling method using a film peeling apparatus according to an exemplary embodiment of the present invention will be described in detail below.

Figure 2:
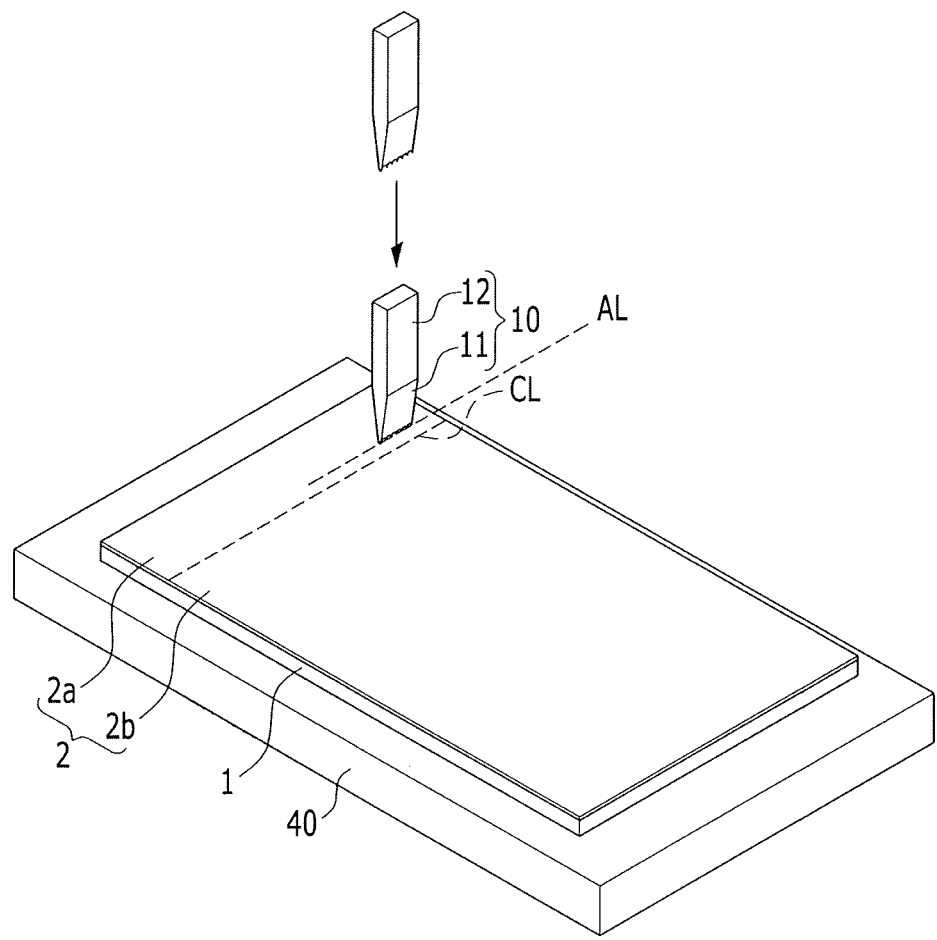
FIG. 2 is a perspective view illustrating a step of a film peeling method by using a film peeling apparatus of FIG. 1 according to an exemplary embodiment of the present invention.
Figure 3:
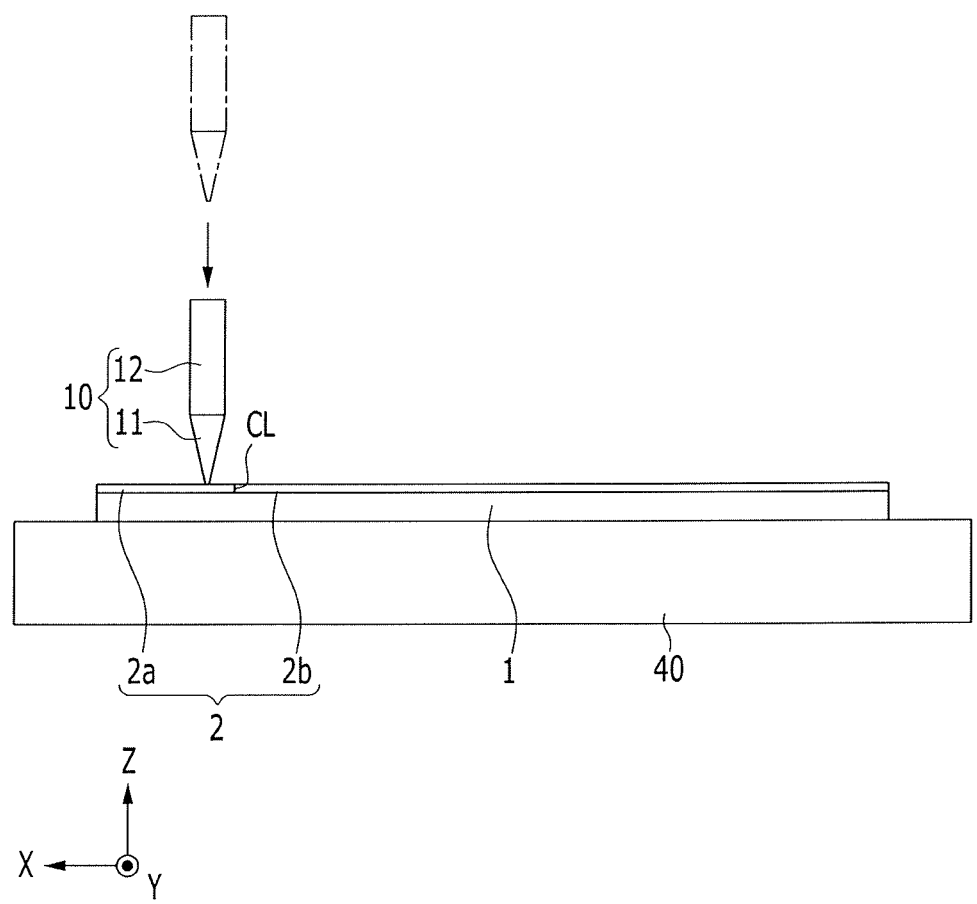
FIG. 3 is a frontal view of FIG. 2 according to an exemplary embodiment of the present invention.
Figure 4:
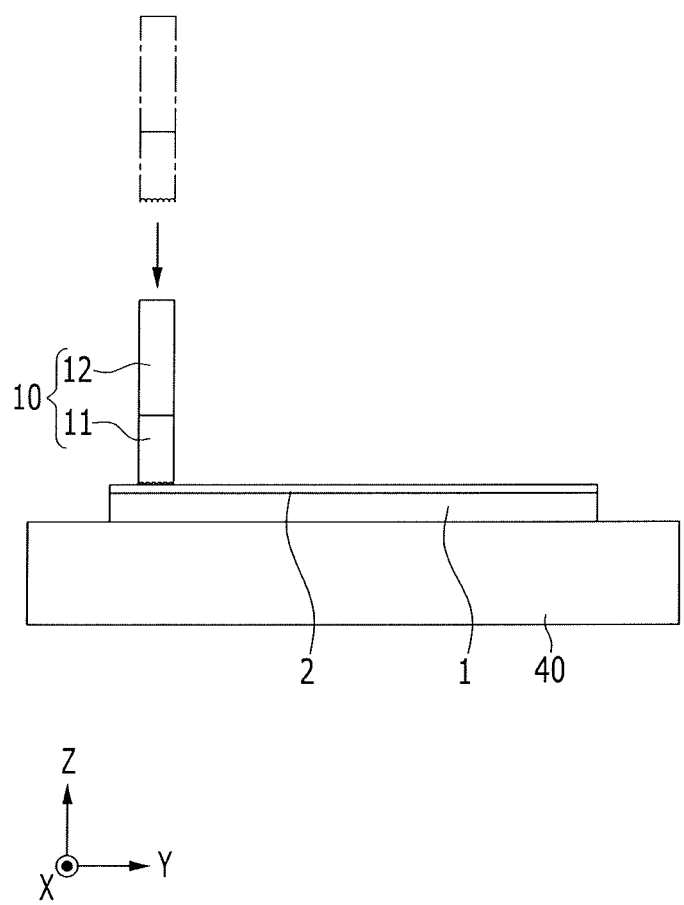
FIG. 4 is a side view of FIG. 2 according to an exemplary embodiment of the present invention.

FIG. 2 is a perspective view illustrating a step of a film peeling method using a film peeling apparatus of FIG. 1 according to an exemplary embodiment of the present invention. FIG. 3 is a frontal view of FIG. 2 according to an exemplary embodiment of the present invention. FIG. 4 is a side view of FIG. 2 according to an exemplary embodiment of the present invention.

Figure 5:
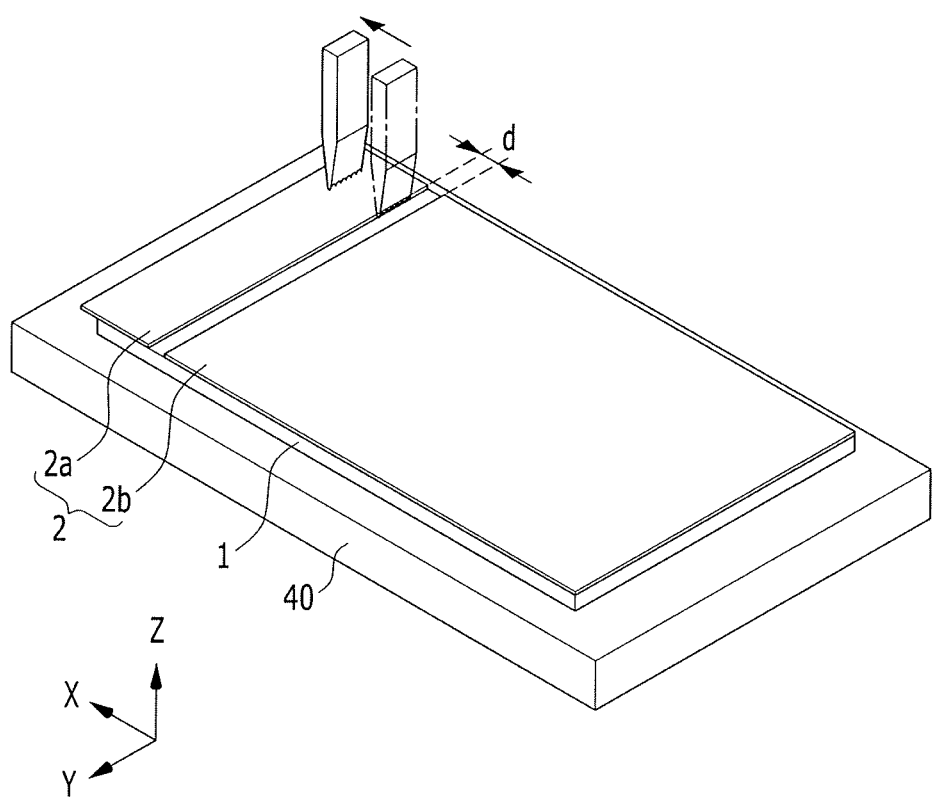
FIG. 5 is a perspective view illustrating a step of a film peeling method of FIG. 2.
Figure 6:
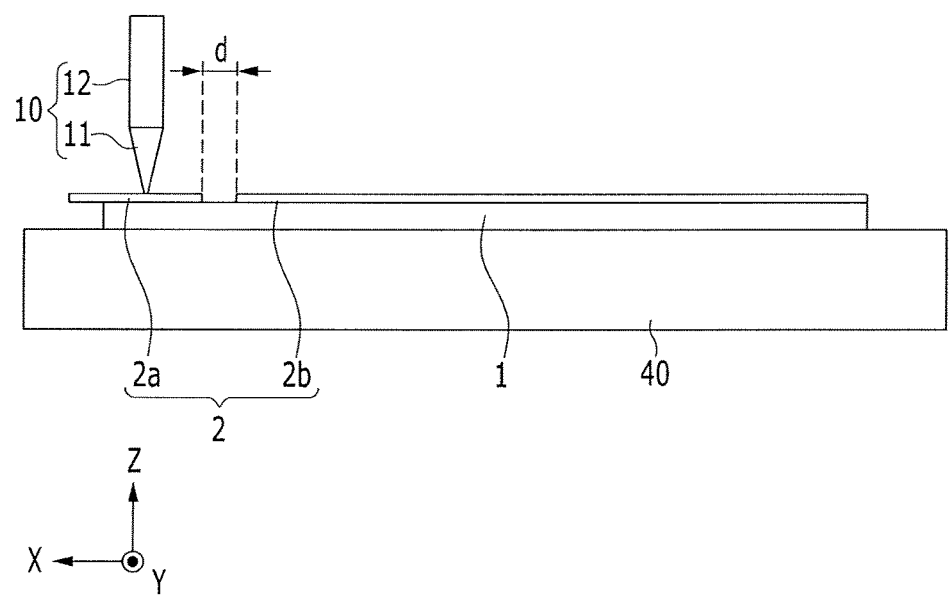
FIG. 6 is a frontal view of FIG. 5 according to an exemplary embodiment of the present invention.
Figure 7:
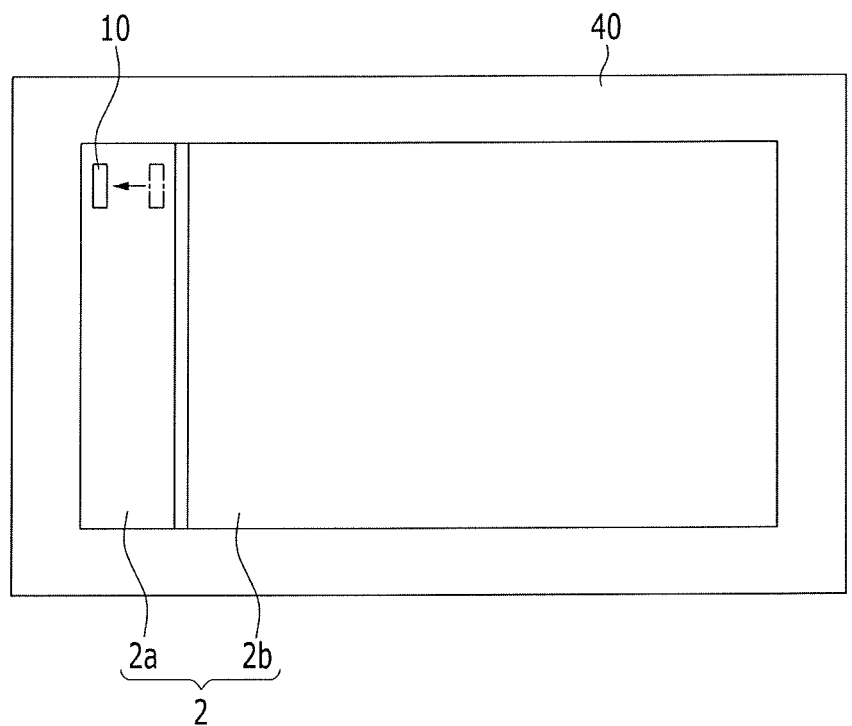
FIG. 7 is a top plan view of FIG. 5 according to an exemplary embodiment of the present invention.
Figure 9:
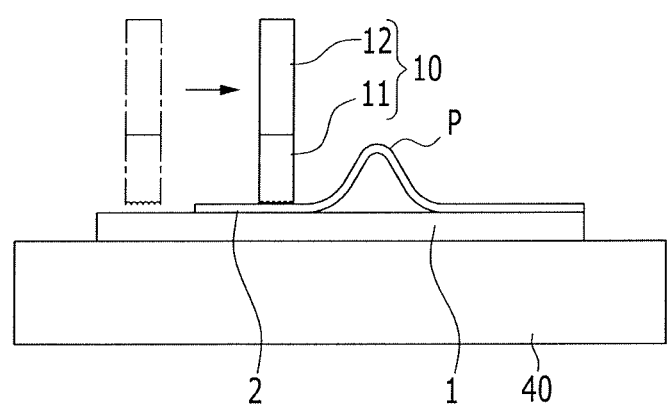
FIG. 9 is a side view of FIG. 8 according to an exemplary embodiment of the present invention.
Figure 9:
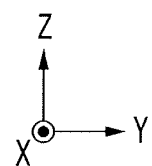
Figure 10:
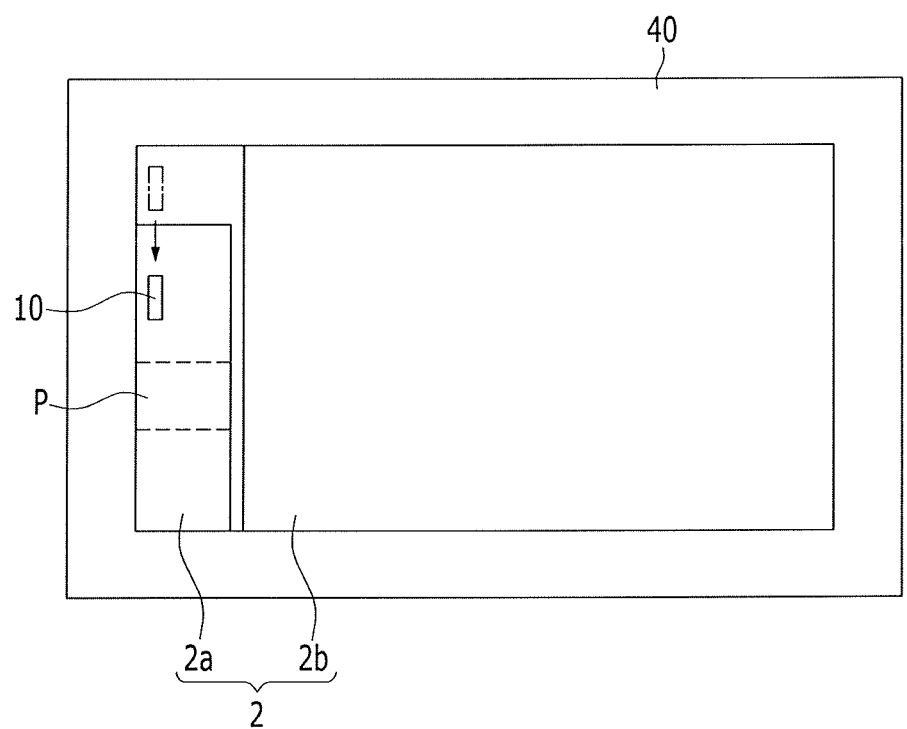
FIG. 10 is a top plan view of FIG. 8 according to an exemplary embodiment of the present invention.
Figure 11:
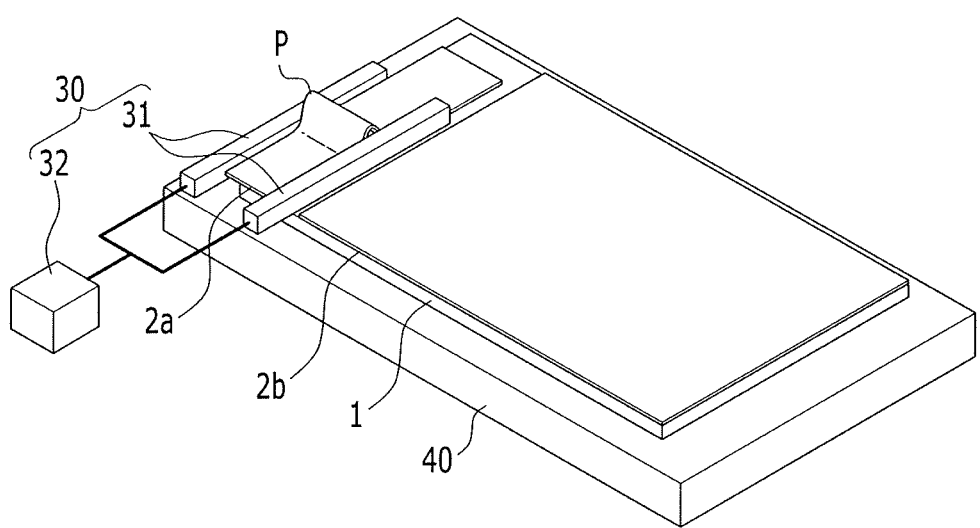
FIG. 11 is a perspective view illustrating a step following a step of FIG. 8 according to an exemplary embodiment of the present invention.

FIG. 5 is a perspective view illustrating a step following a step of FIG. 2 according to an exemplary embodiment of the present invention. FIG. 6 is a frontal view of FIG. 5 according to an exemplary embodiment of the present invention. FIG. 7 is a top plan view of FIG. 5 according to an exemplary embodiment of the present invention. FIG. 8 is a perspective view illustrating a step following a step of FIG. 5 according to an exemplary embodiment of the present invention. FIG. 9 is a side view of FIG. 8 according to an exemplary embodiment of the present invention. FIG. 10 is a top plan view of FIG. 8 according to an exemplary embodiment of the present invention. FIG. 11 is a perspective view illustrating a step following a step of FIG. 8 according to an exemplary embodiment of the present invention.

As illustrated in FIG. 1, the protective film 2 of the display panel 1 may be cut to form a cutting line CL in the protective film 2. The protective film 2 of the display panel 1 may be cut by using a laser. The protective film 2 may be divided into the peripheral protective film 2a and the display protective film 2b along the cutting line CL.

As illustrated in FIGS. 2 to 4, the uneven portions 11a of the peeling pin 11 may directly contact the peripheral protective film 2a by downwardly moving the peeling unit 10 in the vertical direction (e.g., the Z-axis direction). The peeling pin 11 may be disposed such that a virtual extension line AL of the uneven portions 11a is disposed substantially in parallel with the cutting line CL.

As illustrated in FIGS. 5 to 7, the peeling unit 10 may be moved in the second direction (e.g., the X-axis direction) to separate the peripheral protective film 2a from the display protective film 2b. The peripheral protective film 2a may be separated from the display protective film 2b by a predetermined interval d. Since the peeling pin 11 has the uneven portions 11a, a frictional force between the peripheral protective film 2a and the peeling pin 11 may be larger than an adhesive force of the peripheral protective film 2a. Accordingly, the peripheral protective film 2a may be relatively easily separated from the display protective film 2b.

As illustrated in FIGS. 8 to 10, the peeling unit 10 may be moved in the first direction (e.g., the Y-axis direction) to form the curved portion P in the peripheral protective film 2a. Since the frictional force between the peeling pin 11 having the uneven portions 11a and the peripheral protective film 2a may be greater than the adhesive force of the peripheral protective film 2a, the curved portion P may be relatively large.

As illustrated in FIG. 11, the curved portion P of the peripheral protective film 2a may be clamped by using the pair of tongs 31 of the clamp 30. The pair of tongs 31 may be moved by using the tongs mover 32 to peel off the peripheral protective film 2a from the display panel 1. The peeled-off peripheral protective film 2a may be discarded in a scrap box. Alternatively, the peeled-off peripheral film 2a may be discharged by using a vacuum hose.

While exemplary embodiments of the present invention have been described herein, it is to be understood that the disclosure is not limited to the disclosed exemplary embodiments, but, on the contrary, is intended to cover various modifications and equivalent arrangements included within the spirit and scope of the present invention.

What is claimed is:
1. A film peeling apparatus, comprising:
   a peeling unit configured to peel off a protective film attached on a display panel;
   a peeling unit position adjuster connected to the peeling unit and configured to adjust a position of the peeling unit; and a clamp disposed separately from the peeling unit and configured to clamp a peeled-off portion of the protective film, wherein the peeling unit includes a peeling pin configured to contact the protective film, and a peeling rod extending from the peeling pin and connected to the peeling unit position adjuster, wherein an end portion of the peeling pin had uneven portions.

2. The apparatus of claim 1, wherein the peeling pin includes:

a first surface having a first width extending in a first direction; and a second surface having a second width extending in a second direction, wherein the second direction crosses the first direction, and wherein the first width is greater than the second width.

3. The apparatus of claim 2, wherein a longitudinal direction of the uneven portions is substantially parallel to the first direction.

4. The apparatus of claim 1, further comprising a stage configured to mount the display panel therein.

5. The apparatus of claim 1, wherein adjacent uneven portions of the peeling unit are separated from each other by about 50 nm to about 400 nm.

6. The apparatus of claim 1, further comprising a turn-on test pad disposed in a peripheral portion of the display panel and is configured to be accessed for performing a turn-on test of the display panel.

7. A film peeling method, comprising:

providing a peeling unit having uneven portions at an end portion thereof;

contracting the peeling unit to a peripheral protective film attached to a peripheral portion of a display panel;

cutting the protective film disposed on the display panel using a laser;

separating the peripheral protective film from a display protective film of a display unit of the display panel along a cutting line by moving the peeling unit;

forming a curved portion in the peripheral protective film by moving the peeling unit; and removing the peripheral protective film from the display panel.

8. The method of claim 7, wherein a position of the peeling unit is adjusted by using a peeling unit position adjuster connected to the peeling unit.

9. The method of claim 7, wherein the peeling unit includes a peeling pin configured to contact the protective film, and an end portion of the peeling pin may have the uneven portions extending in a first direction.

10. The method of claim 9, wherein the peeling pin is disposed such that a longitudinal direction of the uneven portions is substantially parallel to the cutting line to allow the peeling pin to contact the peripheral protective film.

11. The method of claim 10, wherein the peeling pin is moved in a second direction crossing the cutting line to separate the peripheral protective film from the display protective film.

12. The method of claim 10, wherein the peeling pin is moved in the first direction to form a curved portion in the peripheral protective film.

13. The method of claim 12, wherein the peripheral protective film is removed from the display panel by clamping the curved portion of the peripheral protective film with a clamp.

14. A film peeling apparatus, comprising:

a peeling unit having a plurality of uneven portions at an end portion thereof;

a peeling unit position adjuster connected to the peeling unit; and a clamp disposed separately from the peeling unit to clamp a peeled-off portion of a protective film, wherein adjacent uneven portions of the peeling unit are separated from each other by about 50 nm to about 400 nm.

15. The apparatus of claim 14, further comprising a stage configured to mount the display panel therein.

16. The apparatus of claim 14, wherein the peeling unit includes:

a peeling pin configured to contact a protective film attached on a display panel; and a peeling rod extending from the peeling pin to and connected to the peeling unit position adjuster.

17. The apparatus of claim 16, wherein an end portion of the peeling pin has a plurality of uneven portions.

18. The apparatus of claim 16, wherein the peeling pin includes steel (SUS), aluminum (Al), or polyether ether ketone (PEEK).

19. The apparatus of claim 16, wherein the peeling pin in configured to exert a frictional force that is larger than an adhesive force of the protective film.

20. The apparatus of claim 16, wherein the peeling unit disposed above each of the protective film and the clamp, and the clamp is disposed at a side of the protective film.

* * * * *